Patented Oct. 26, 1926.

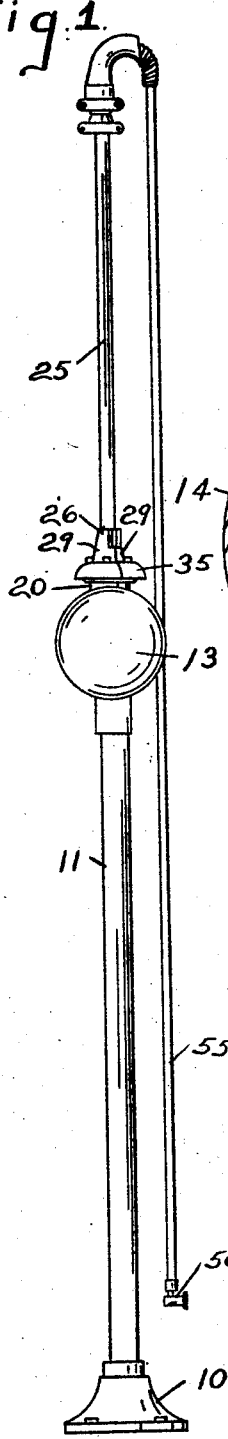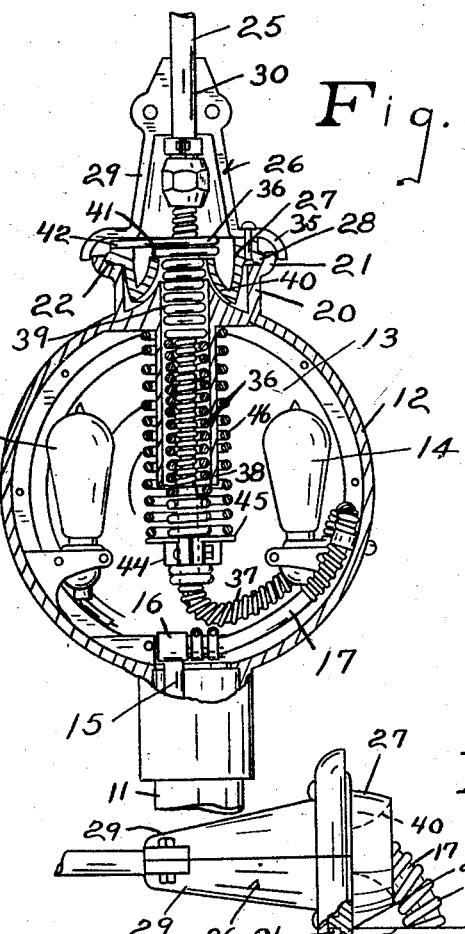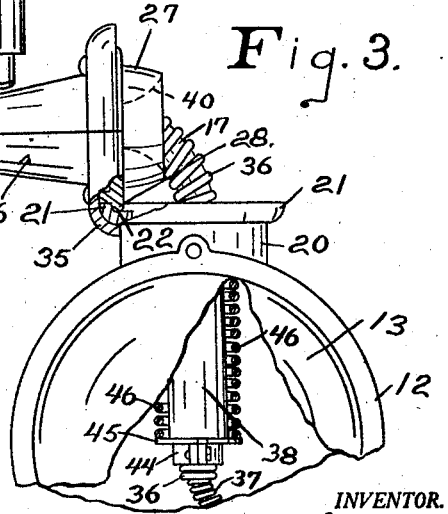

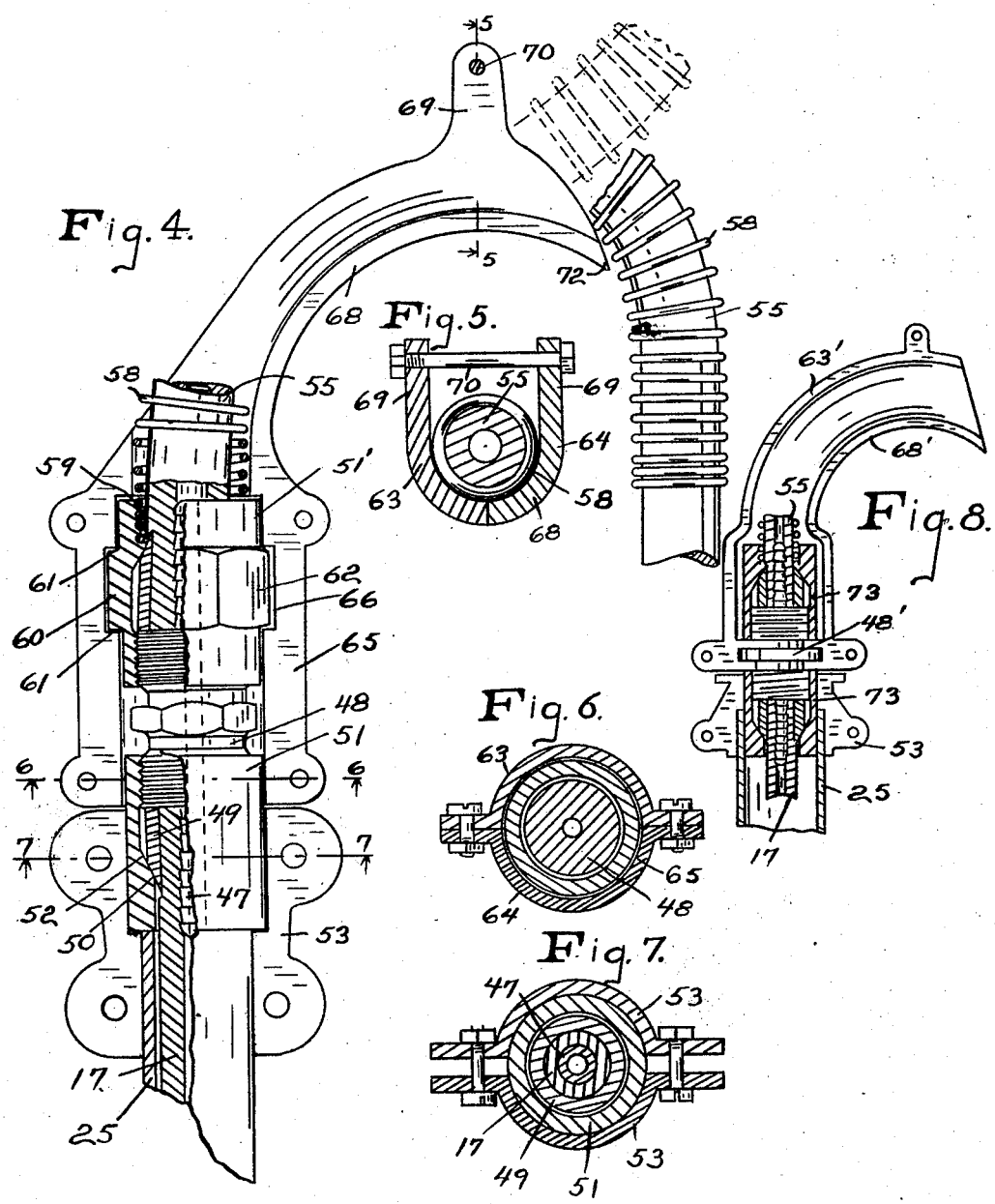

1,604,813

UNITED STATES PATENT OFFICE.

ARNO A. EWALD, OF OAKFIELD, WISCONSIN.

AIR STATION.

Application filed June 27, 1924. Serial No. 722,652.

This invention relates to improvements in air stations.

It is the principal object of this invention to provide a novel and improved air station of the general type shown in the patent to Ewald, No. 1,427,450, of August 29, 1922. It has been my purpose to provide an air station in which the tendency of the air hose to become kinked or injured at points of repeated flection may be minimized.

In attaining the above object, I have worked out a construction in which the air hose is supported throughout most of its length to the top of the device and in which no sharp bends or kinks of the hose are possible within the length of the air station proper.

While providing a device adapted to safeguard the hose concealed therein, it has nevertheless been one of the most important objects of this invention to provide a construction which will attain a maximum of flexibility in that the hose may be drawn at any angle to flex an upstanding arm of the air station for a full 90° from its normal position, the movement of said arm being equally limited in every direction in which it may be drawn by the hose depending therefrom.

Other objects of this invention are to provide in a device of this character a universally tiltable, normally upright member with a stop limiting the movement of said member in any direction beyond 90° from its normal and original position; to provide a tiltable, normally upright hose carrying member which may be moved a predetermined angular distance in any direction from its normal upright position and may, after having been moved through such distance, be readily adjusted to a different direction, the said member being adapted to return to its original position from any direction to which it may be moved; to provide in a device of the character specified a novel and improved universal fitting to guide a depending hose from the top of a flexible air station; and to provide a novel and compact disposition of hose and hose securing means with other devices in the limited space available within an air station.

In the drawings:

Figure 1 is an elevation of a complete device embodying this invention.

Figure 2 is a vertical central section on an enlarged scale through a portion of the device shown in Figure 1, showing the interior construction thereof in detail.

Figure 3 is a further detail view showing an adjustment which is possible between certain of the parts illustrated in Figure 2.

Figure 4 is a detail view in partial section of the swivelled hose support at the upper end of the air station.

Figure 5 is a sectional view taken on line 5—5 of Figure 4.

Figure 6 is a sectional view taken on line 6—6 of Figure 4.

Figure 7 is a sectional view taken on line 7—7 of Figure 4.

Figure 8 is a view similar to Figure 4 on a smaller scale and illustrating in longitudinal section a modified construction.

Like parts are identified by the same reference characters throughout the several views.

As explained in the above mentioned Patent, No. 1,427,450, it is desirable to keep the valve fitting of a tire filling air hose off of the ground so that it will not become choked with mud or dust, will always be reasonably clean in those portions handled by the operator, and will always be conveniently accessible. At the same time, the air station which supports such hose should be so constructed that it may at low expense have great inherent flexibility. This is accomplished by providing a normally upright arm through which the air hose passes and from the end of which the air hose hangs. To be properly serviceable such an arm should be so constructed as to tilt yieldably in every direction without undue resistance.

In the present air station a base 10 carries a rigid tubular post 11 upon which is mounted a head 12 provided preferably with one or more glass faces 13 which may be interiorly illuminated by means of electric bulbs 14, or otherwise. The air pipe 15 is led upwardly through the column 11 and is provided with a coupling member at 16, whereby the hose 17 is fastened thereto.

The head 12 is provided with an upstanding sleeve 20 upon which is formed an annular flange 21 extending laterally and upwardly from the upper margin of sleeve 20 to provide a channelled shoulder 22. Upon this device the arm 25, which is flexibly tiltable in any direction, is supported.

Arm 25 is mounted on a fitting designated in its entirety by reference character 26. This fitting includes an annular part 27 provided with a radially extending annular flange 28. The fitting also includes a pair of co-operating members 29 bolted to member 27 and to each other, and adapted at 30 to embrace the pipe-like arm 25. When the members 29 are clamped together they will rigidly engage the arm 25 for the support thereof.

It will be noted that the diameter of the flange portion 28 of casting 27 is such that the flange just fits within flange 21 upon the annular shoulder 22. Thus, the shoulder provides a firm seat from which the arm 25 is carried. It will be noted further that the seat 22 has a surface which is arcuately concentric with the exterior surface of flange 28. The exterior surface of flange 21 is likewise concentric and the castings 29 are provided with registering flanges comprising a skirt portion 35, the curve of which is also concentric to the surfaces above mentioned.

This entire arrangement is so calculated that when the arm 25 is tilted in any direction whatsoever one portion of the flange 28 will act as a fulcrum within the channelled shoulder 22 and the entire arm and its support 26 will tilt about said fulcrum toward a position similar to that indicated in Figure 3. Such tilting movement will be opposed by springs hereinafter to be described, but the springs will yieldingly permit the tilting movement to continue until the arm 25 has swung approximately 90° from its original position. At that time the end of flange 21 will contact with casting 27 above the flange 28 thereof, and simultaneously the end of the skirt portion 35 of the device will contact with sleeve 20 below flange 21. Thereupon no further pivotal movement about the axis of the lowest portion of flange 28 is possible, and any continued tilting movement about the lower extremity of flange 35 as an axis is opposed by the interlocking engagement of flanges 21 and 28, as is clearly shown in Figure 3. Any slight tendency of flange 28 to become lifted over flange 21 is opposed by the spring which holds arm 25 normally vertical. In practice this arrangement provides a positive lock limiting the arm 25 to 90° of pivotal movement in any desired direction from its original position.

It is particularly to be noted, however, that when the arm 25 is in the horizontal position as illustrated in Figure 3 and is thereby limited against further downward oscillation, it is possible for the operator to walk entirely around the standard 11 and to draw with him arm 25, which will thus be caused to describe a complete circle in a horizonal plane. In so doing, it will roll upon the channelled shoulder 22 provided by flange 21 on sleeve 20 and no harm whatsoever will be occasioned to the mechanism if it is so handled. In any position of rotative adjustment in a horizontal plane the arm 25 will, if released by the operator, swing upwardly to its normal vertical position under the tension of a suitable spring.

In the preferred arrangement the hose 17, coupled at 16 to supply pipe 15, is coiled upwardly within the drum-like head 12 about the socket for one of the lamps 14. It is thence led downwardly to a position immediately above standard 11 and enters the coil of a comparatively powerful and closely wound helical spring 36. The hose itself may be protected by a smaller helical spring 37 to keep it from kinking or bending too sharply at any point. Spring 36 passes upwardly through a depending sleeve 38 and through an aperture 39 in the head 12, which aperture comprises an extension of the opening in said sleeve. The inner surface 40 of the annular casting 27 corresponds in form to the frustum of a cone, having concave sides in any vertical plane. Surface 40 terminates in a spring seat 41 above which the spring 36 is expanded in diameter for engagement with said seat. The end 42 of the spring may be clampingly engaged between casting 27 and one of the castings 29. Spring 36 is a tension spring, but its principal function is that of a resilient connecting member, and it is comparatively infrequently called upon in the normal operation of the device to operate as a spring.

A clamp 44 is adjustably engageable with any desired portion of spring 36 and carries at 45 a disk between which and the top of head 12 there is confined a relatively large and relatively resilient compression spring 46. This is the spring which is active in yieldably maintaining the arm 25 in its normal vertical position. When the arm is forced downwardly to the position in which it appears in Figure 3, the spring 36, acting as a connecting member only, will flex itself about the curved supporting surface 40 and will be drawn upwardly through the opening 39 in head 12 proportionally to the extent to which the arm 25 is tilted toward the Figure 3 position. Spring 36 is moving upwardly in proportion with the tilting of arm 25 will subject the active compression spring 46 to pressure, and the said spring will be caused to yield to permit the tilting movement of the arm. When the arm 25 is relieved of tilting pressure the compression spring 46 will expand and its expansible force will be transmitted through the flexible connector 36 to the central part of casting 27 where it will operate to oscillate said casting and the supported arm 25 about a point on the periphery of flange 28 as a fulcrum to restore the device to its original position.

It requires a great deal more power to lift arm 25 from its fully depressed position than is required to restore the arm after it has been but slightly tilted from the vertical. Consequently, I have found it convenient so to construct the spring 46 that shortly before the arm 25 reaches its fully depressed position, as shown in Figure 3, spring 46 will be fully compressed so that its several coils will be in mutual contact. Any further depression of the arm 25 will result in placing the relatively stronger spring 36 under tension. Consequently, I am able by this construction to provide a relatively strong spring pressure for elevating the arm 25 from the horizontal and a relatively weaker spring pressure for acting on said arm as it approaches the vertical. The sleeve 38 serves as a guide for both of the springs and may, if desired, be extended to a position where the disk 45 will contact positively therewith to limit the compression of spring 46 and to cause spring 36 to be put under tension.

The peculiar disposition of the air hose 17 about the socket of lamp 14, as shown in Figure 2, is such as to distribute over a considerably elongated portion of such hose the bending effect which results from the tilting of arm 25 and the corresponding upward movement of collar 44. The wear on the length of hose within head 12 is, by this construction, reduced to a negligible factor.

As above indicated, the arm 25 may conveniently comprise a length of pipe. The hose 17 preferably extends through the length of this pipe and projects from the extremity thereof as shown in Figure 4. The hose coupling device includes an inner nipple 47 which is received within the hose in the usual manner. This nipple is carried by a threaded tubular plug 48 which also carries a sleeve 49 adapted to embrace the outer side of the hose and provided with a bevelled extremity 50. A threaded sleeve 51 is adjustable on the plug member 48 and is provided with an interiorly bevelled surface 52 complementary to that shown at 50. The arrangement is such that when the sleeve 51 is turned up on plug member 48 the end of hose 17 will be firmly engaged. A clamp comprising a pair of complementary half sleeves 53 serves to connect the entire coupling device rigidly with the end of the pipe arm 25.

At its other end the plug member 48 is provided with a hose coupling device similar to that already described, whereby there is connected to the plug member a length of hose 55 which is adapted to hang from the top of arm 25, and which carries at its end a tire filling valve 56. A portion of this hose is wound with spring wire as at 58 to keep it from becoming kinked or too shortly flexed. In order to retain this wire, the sleeve 51′, which corresponds otherwise with sleeve 51, may conveniently be provided with a threaded recess at 59, the coils of spring 58 being engaged in the threads.

The sleeve 51′ also differs from sleeve 51 in that it is provided with an enlarged portion 60 terminating in shoulders 61. This enlarged portion is preferably faced as at 62 to receive a wrench. The shoulders 61 serve to position a swivelled guide or support for the hose which will now be described.

The hose support preferably comprises two complementary castings 63 and 64 which are so formed as to provide at 65 a bearing member adapted to be mounted on sleeve 51 and 51′ and to be positioned on said sleeves by means of an annular recess 66 which receives the enlarged portion 60 of sleeve 51′. The arrangement is such that the bearing member, when assembled, will swivel freely on sleeves 51 and 51′ so that it may be rotated to any angular position with reference to such sleeves.

Above the bearing 65 provided by the two castings comprising the support is a curved channel 68 in which the hose 55 rests. The hose is confined to this channel by means of a pair of upwardly extending lugs 69 which are connected by a transverse bolt 70 at a point considerably above the normal position of the hose. The channel 68 curves to guide the hose from a substantially vertical position to a position considerably beyond the horizontal so that when the pipe arm 25 is vertical the hose will hang without cramping from the lip portion 72 of channel 68 in a manner clearly shown in Figures 1 and 4. When the arm 25 is horizontal, and when the operator draws the valve 56 to a greater distance from standard 11 than is represented by the length of arm 25, the hose will flex outwardly from its support at 68 somewhat in the manner indicated in dotted lines in Figure 4. It will be confined against a too great outward movement by the bolt 70 and will be prevented from too sharp a bend by the winding of wire 58. When the hose is released arm 25 will be drawn erect by the springs already described and the hose, being confined within channel 68 by bolt 70, will fall back to the position in which it is shown in full lines in Figures 1 and 4.

In the modified construction in Figure 8 the sleeve 73 corresponding to sleeve 51 is fitted within pipe 25, and the clamping member 53′ is correspondingly formed. Another sleeve 73 is used in place of sleeve 51′ so that in the modified construction the upper and lower sleeves engaging the central plug are identical in construction. The plug 48′ with which these sleeves are engaged is similar to that already described, in its provision of means for engaging the hose. In the modified construction, however, the swivelled hose support is engaged directly with the central plug 48' instead of being positioned with sleeve, which corresponds to the sleeve 51' previously described. It will be noted further that the hose support includes a casting 63' which, with a complementary casting, forms a conduit at 68', closed above the trough for the support of the hose.

In both of the illustrated constructions for the swivelled hose support, the support is adapted to rotate freely on the casting of the pipe-like arm 25 and the hose rides in the channeled surface of a laterally and curvedly extending bracket.

I claim:

1. In a device of the character described, the combination with a standard provided with an annular seat, of a pipe provided with a bearing member complementary to said seat and universally mounted thereon to fulcrum upon any corresponding portions of the peripheries of said bearing member and said seat, a flexible conduit leading upwardly through said standard and through said seat and connected with said pipe, and a flexible annular connector concentric with said conduit and attached to said pipe and provided with means adapted to exert a pressure through said connector urging said pipe and bearing member in the direction of said seat.

2. In a device of the character described, the combination with a standard provided with an annular seat, of a pipe provided with a bearing member complementary to said seat and adapted to provide an infinite number of available fulcrum points radially remote from the axis of said pipe and said seat, a conduit leading through said standard and said seat to said pipe, and a flexible hose supported from a portion of said pipe remote from said seat and in communication through said pipe with said conduit.

3. In a device of the character described, the combination with a standard providing a channeled annular seat, of a substantially rigid arm provided with a terminal annular flange complementary to said channeled seat and adapted to be supported therefrom to maintain said arm in a normally vertical position, an annular limiting skirt carried by said arm and adapted for contact with a portion of said standard in a predetermined angular position of said arm in a vertical plane and in any angular position of said arm in a horizontal plane, said seat being formed for interlocking with said flange in angular positions of said arm in a vertical plane.

4. In a device of the character described, the combination with a standard providing a channeled annular seat bounded by an upturned peripheral flange; of a supporting arm provided with an annular fulcrum flange receivable within the upstanding flange of said seat, and a motion limiting skirt depending from said arm exteriorly of said seat concentrically therewith; a flexible connector attached to said arm and extending through said seat; and means within said standard for exerting through said connector a force tending to draw said arm to said seat.

5. In a device of the character described, the combination with a standard providing a channeled annular seat bounded by an upturned peripheral flange; of a supporting arm provided with an annular fulcrum flange receivable within the upstanding flange of said seat, and a motion limiting skirt depending from said arm exteriorly of said seat concentrically therewith; a flexible connector attached to said arm and extending through said seat; and means within said standard for exerting through said connector a force tending to draw said arm to said seat, said arm being formed internally with an annular bearing surface adapted to co-operate with said connector and disposed substantially on arcs concentric with all fulcrum points of said fulcrum flange in vertical radial planes of said flange, whereby said connector will act upon said arm at points substantially equi-distant from each fulcrum thereof regardless of the degree to which the arm is tilted.

6. In a device of the character described, the combination with a standard and a supporting arm normally vertical with respect to said standard and tiltable in a plurality of directions from its normally vertical position, of a flexible connector attached centrally to said arm and extending into said standard, and a compression spring interposed between a portion of said connector and the top of said standard.

7. In a device of the character described, the combination with a standard providing an annular seat having a substantially vertical axis, of a hose supporting arm provided with an annular member complementary to said seat and adapted to receive support therefrom whereby to maintain said arm in a substantially vertical position, a compression spring within said standard, and a flexible connector passing substantially axially through said seat and attached to said spring and centrally to said arm.

8. In a device of the character described, the combination with a standard providing an annular seat having a substantially vertical axis, of a hose supporting arm provided with an annular member complementary to said seat and adapted to receive support therefrom whereby to maintain said arm in a substantially vertical position, a compression spring within said standard, a flexible connector passing substantially axially through said seat and attached to said spring and centrally to said arm, a conduit concentric with said connector, and a flexible hose supported from said arm and in communication along said arm with said conduit.

9. In a device of the character described, the combination with a standard and an arm supported therefrom and tiltable in a plurality of directions from a normally vertical position, of means providing an annular series of fulcrum points for said arm, resiliently yieldable tension means connected with said arm and disposed axially of said annular series of fulcrum points, and a supply conduit substantially co-axial with said tension means and leading to said arm.

10. In a device of the character described, the combination with a support and an arm tiltable in a plurality of directions from a normally vertical position, of a set of annular clamping members connected respectively with said arm and said support and providing a plurality of fulcrum points for said arm in an annular series, a conduit leading substantially axially through said clamping members to said arm, and a helical spring anchored to said arm and extending substantially concentrically with said conduit through said clamping members.

11. In a device of the character described, the combination with a standard providing an annular seat and an arm provided with a bearing member complementary to said seat and adapted to fulcrum thereon at any one of a plurality of bearing points in annular series, of a plurality of springs connected in series, the spring at one end of said series being connected centrally with said arm, and certain of said springs being of differing strength.

12. In a device of the character described, the combination with a standard providing an annular seat and an arm provided with a bearing member complementary to said seat and adapted to fulcrum thereon at any one of a plurality of bearing points in annular series, of a plurality of springs connected in series, the spring at one end of said series being connected centrally with said arm, certain of said springs being of different strength, and means for relieving a weaker spring of load at a predetermined point in the pivotal movement of said arm about one of its fulcrums, whereby to transmit to another of said springs any pressure produced by a subsequently continued tilting movement of said arm.

13. In a device of the character described, the combination with a standard providing an annular bearing and an arm provided with a complementary bearing member adapted to fulcrum about said bearing at any of an annular series of fulcrum points, of a central tension spring connected with said arm and extending through said seat, and a compression spring concentric with said tension spring and provided with a seat on said standard and a seat connected with said tension spring.

14. In a device of the character described, the combination with a standard providing an annular seat and an arm provided with a bearing member complementary to said seat and adapted to fulcrum thereon at any of a plurality of fulcrum points arranged in annular series, of a flexible conduit connected with said arm extending downwardly through said seat, a connector concentric with said conduit, and a spring connected with said connector and adapted to draw said member to said seat.

15. In a device of the character described, the combination with a support providing an annular seat and an arm mounted on said support and provided with a bearing member complementary to said seat and adapted to fulcrum thereon at any of a plurality of fulcrum points in annular series, a flexible air conduit connected with said arm and extending through said seat, a tension spring concentric with said conduit and connected with said arm, and a compression spring interposed between said standard and a portion of said tension spring.

16. In a device of the character described, the combination with a support providing an annular seat and an arm mounted on said support and provided with a bearing member complementary to said seat and adapted to fulcrum thereon at any of a plurality of fulcrum points in annular series, a flexible air conduit connected with said arm and extending through said seat, a tension spring concentric with said conduit and connected with said arm, a compression spring interposed between said standard and a portion of said tension spring, and provided with means adjustably connecting it with said tension spring.

17. In a device of the character described, the combination with a support providing an annular seat and an arm mounted on said support and provided with a bearing member complementary to said seat and adapted to fulcrum thereon at any of a plurality of fulcrum points in annular series, a flexible air conduit connected with said arm and extending through said seat, a tension spring concentric with said conduit and connected with said arm, and a compression spring interposed between said standard and a portion of said tension spring, said tension spring being relatively strong as compared with said compression spring.

18. In a device of the character described, the combination with a support providing an annular seat and an arm mounted on said support and provided with a bearing member complementary to said seat and adapted to fulcrum thereon at any of a plurality of fulcrum points in annular series, a flexible air conduit connected with said arm and extending through said seat, a tension spring concentric with said conduit and connected with said arm, and a compression spring interposed between said standard and a portion of said tension spring, said tension spring being relatively strong as compared with said compression spring, together with a guide interpoed between said tension and compression springs and adapted at a predetermined point in the compression of the compression spring to relieve said spring of load substantially as described.

19. In a device of the character described, a bearing sleeve provided with an outwardly and upwardly turned annular flange at its extremity whereby to provide a channelled annular seat, in combination with a complementary bearing member provided with a radial annular flange adapted to fit within the upwardly turned portion of the first mentioned flange, said bearing member being adapted to fulcrum at an infinite number of points on said seat, and means for limiting the pivotal movement of said bearing member on said seat irrespective of the fulcrum about which such movement occurs.

20. In a device of the character described, a bearing sleeve provided with an outwardly and upwardly turned annular flange at its extremity whereby to provide a channelled annular seat, in combination with a complementary bearing member provided with a radial annular flange adapted to fit within the upwardly turned portion of the first mentioned flange, said bearing member being adapted to fulcrum at an infinite number of points on said seat, and means for limiting the pivotal movement of said bearing member on said seat irrespective of the fulcrum about which such movement occurs, said means comprising an annular skirt carried by said member and adapted for contact with said sleeve.

21. In a device of the character described, the combination with an annular seat, of a complementary annular bearing member, resiliently yieldable means connected centrally with said bearing member and urging it toward a position of full annular contact with said seat, said bearing member being adapted to fulcrum on said seat at any of a plurality of fulcrum points in annular series thereon, and said bearing member and said seat being formed for interlocking engagement in a selected angular position irrespective of which of the said fulcrum points comprises the axis about which such angular position is assumed.

ARNO A. EWALD.